United States Patent
Akhteruzzaman

[19]

[11] Patent Number: 5,828,748
[45] Date of Patent: Oct. 27, 1998

[54] METHOD FOR CUSTOMIZING OPERATION OF A LINE INTERFACE CIRCUIT IN A TELECOMMUNICATIONS NETWORK

[75] Inventor: Akhteruzzaman, Naperville, Ill.

[73] Assignee: Lucent Technologies, Murray Hill, N.J.

[21] Appl. No.: 672,190

[22] Filed: Jun. 27, 1996

[51] Int. Cl.⁶ .................................................. H04M 19/00
[52] U.S. Cl. ..................... 379/399; 379/324; 379/394; 379/398; 379/400; 379/413
[58] Field of Search ..................... 379/324, 394, 379/398, 399, 400, 413; 363/21

[56] References Cited

U.S. PATENT DOCUMENTS 4,490,580  12/1984  Nagashima .
4,652,701   3/1987  Cubbison, Jr. ............................ 379/373
5,526,425   6/1996  Meyer et al. ............................. 379/402

*Primary Examiner*—Daniel S. Hunter
*Assistant Examiner*—Shih-Wen Hsien
*Attorney, Agent, or Firm*—Mony R. Ghose

[57] ABSTRACT

A method for reducing frequency-related power losses in a telecommunication line interface circuit comprises operating a switching converter circuit at an optimum frequency. Determination of the optimum frequency is based upon a subscriber loop length. Particularly, the subscriber loop voltage is detected at a battery feed circuit of the line interface circuit, and used to access an optimum frequency stored in an initialized database. The optimum frequency information is received in the switching converter circuit, and determines its operating frequency.

7 Claims, 3 Drawing Sheets

METHOD FOR CUSTOMIZING OPERATION OF A LINE INTERFACE CIRCUIT IN A TELECOMMUNICATIONS NETWORK

CROSS-REFERENCE TO RELATED APPLICATION

This application is related to the applications of Akhter-uzzaman entitled "Method For Controlling Power Losses Associated With Line Interface Circuits In Telecommunications Networks" and "Method For Customizing Operation Of A Battery Feed Circuit In A Telecommunications Network", which applications are assigned to the assignee of the present application, and are being filed concurrently herewith.

TECHNICAL FIELD

This invention relates to line interface circuits and, more particularly, to supplying power to line interface circuits deployed in telecommunications networks.

BACKGROUND OF THE INVENTION

Line interface circuits (LIC) interconnect customer premises equipment to central office switches via subscriber lines (commonly referred to as "subscriber loops"). For administrative purposes, a plurality of LICs are grouped in an integrated services line unit (ISLU) of a central office switch. An LIC includes a means for delivering current to a subscriber loop, and an external power source. In modem LICs, the means for delivering current to the subscriber loop is a battery feed circuit comprising a complex set of integrated circuits. Power required for the generation of voltage provided to the battery feed circuit is obtained from the external power source, and is subsequently processed by a LIC switching converter circuit. The current delivered to the subscriber loop by the battery feed circuit enables a serving central office switch to detect the presence, and status, of customer premises equipment associated with the subscriber loop. The battery feed circuit also couples audio signals transmitted by the central office switch to the customer premises equipment, and vice versa.

Traditionally, the voltage supplied to the switching converter circuit by the external power source is less than that required by the battery feed circuit to operate customer premises equipment. This is because the switching converter circuit is equipped with a transformer for altering the voltage supplied by the external power source to a pre-determined battery voltage ($V_{bat}$). Presently, known LICs operate at one predefined frequency to provide battery feed circuits with enough power to enable the serving central office switch to detect customer premises equipment, and provide high quality voice transmission.

It is well-known that LIC operation results in the dissipation of power due to frequency-related losses associated with internal components. Particularly, operation of the transformer results in eddy current and hysterisis losses, while semiconductor losses are the by-product of integrated circuit use. Although losses associated with individual LICs might be tolerable, the accumulation of LIC losses (as a result of the large number of LICs in an ISLU) significantly impacts the overall efficiency of the central office switch. Understandably, controlling LIC power losses is of critical importance to telecommunications service providers. Although cooling devices are frequently used to control heat dissipation associated with LIC power loss, these devices are expensive to operate, and require a significant amount of space.

Therefore, there is a need in the art for decreasing heat produced by power losses associated with the operation of LICs in telecommunications networks.

SUMMARY OF THE INVENTION

This need is addressed and a technological advance is achieved in the art by using subscriber loop length as a parameter to selectively alter the operating frequency of an individual LIC in a telecommunications network.

The length of an individual subscriber loop is directly proportional to the geographical distance of its associated customer premises equipment from a serving central office switch. In other words, customer premises equipment located near the serving central office switch has a subscriber loop shorter than customer premises equipment located a great distance from the switch. Due to decreased length, shorter subscriber loops do not have as great a resistance, and hence, do not require as much current to interconnect customer premises equipment to the serving central office switch.

In accordance with the preferred embodiment of the present invention, each LIC detects a voltage (Vloop) of its associated subscriber loop. More particularly, the loop voltage is detected by the battery feed circuit, and received in a digital signal processor (DSP) of the LIC. The DSP uses the loop voltage as an index to a frequency database to determine a precise frequency at which the switching converter circuit should operate. This operating frequency is just sufficient to produce the required amount of current to provide telecommunications services to the customer premises equipment. Excess power is not supplied to shorter subscriber loops. In this manner, the overall frequency-related power loss of a central office switch is reduced.

DETAILED DESCRIPTION

Figure 1:
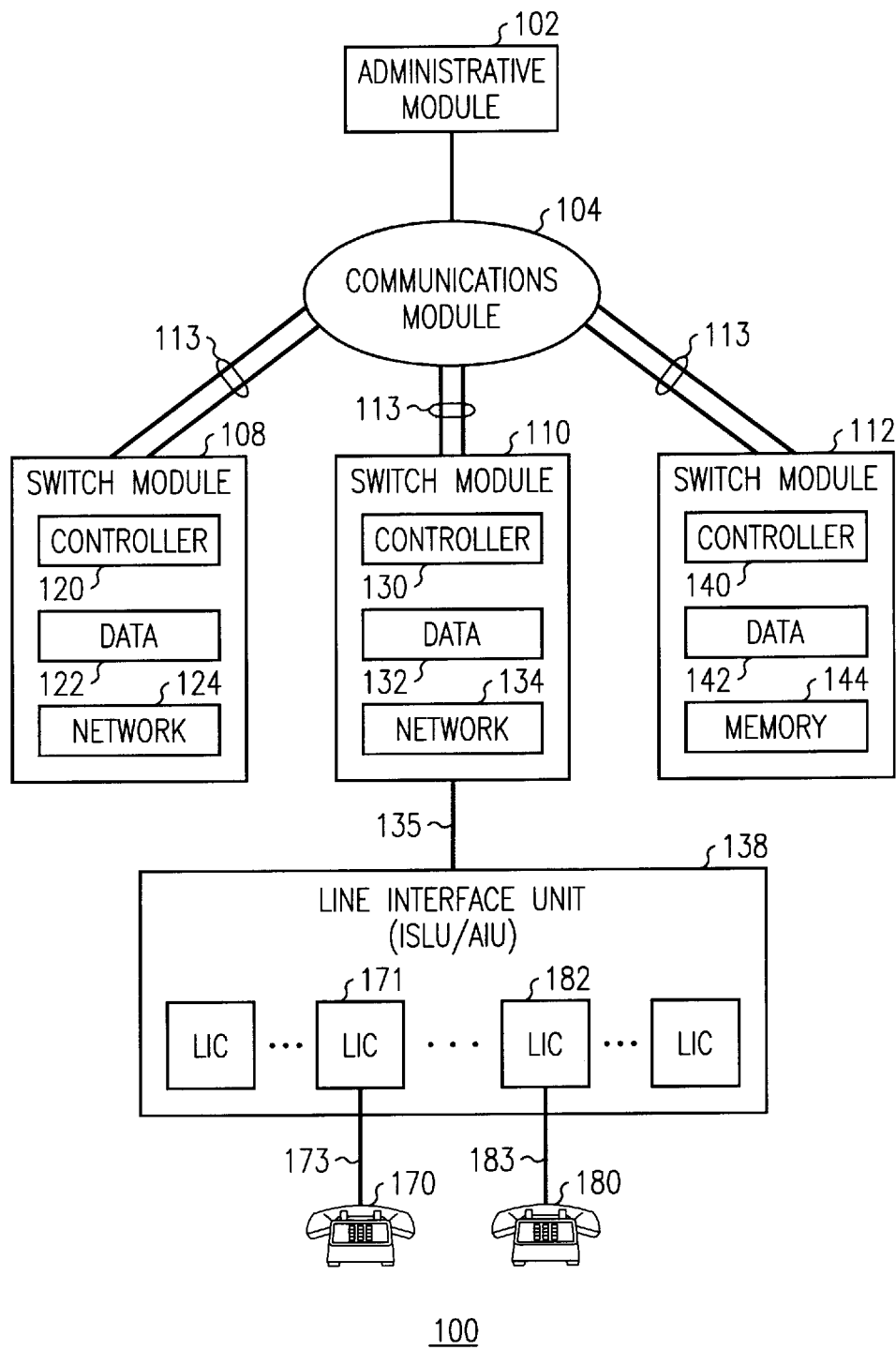
FIG. 1 is a block diagram of a central office switch in which the present invention may be practiced.

FIG. 1 shows a simplified block diagram of a central office telecommunications switch 100 (hereinafter, switch 100) in which the method of the present invention may be practiced. In the preferred embodiment, switch 100 is the 5ESS® manufactured, and sold, by Lucent Technologies. Although a central office switch is shown as an example, any other system in which power must be supplied to individual subscriber lines may be used.

Switch 100 includes three major components: administrative module 102 for providing system-wide administration, maintenance, and resource allocation; communications module 104 for serving as a distribution hub in switching voice, control information, and synchronization signals; and a plurality of switching modules (SM) 108, 110 and 112 for performing local switching and control functions. SMs also provide interfaces to individual subscriber lines, as described below. Communication among the elements of central office switch 100 is accomplished over network control and timing (NCT) links 113. Consistent with convention in the switching art, dual NCT links are shown for the interconnection of each SM to communications module 104.

SMs 108, 110 and 112 include controllers for coordinating global functions, memory for retaining specific subscriber line data, and network elements for routing calls to and from individual subscriber lines. In the embodiment shown, switch module 108 comprises controller 120, data memory 122 and network element 123. Similarly, switch module 110 includes controller 130, data memory 132 and network element 134, and switch module 112 contains controller 140, data memory 142 and network element 144.

Each SM is equipped with an ISLU (also referred to as an access interface unit (AMU)) for interconnecting individual subscriber loops with the central office switch. In this embodiment, a single ISLU/AIU is shown for clarity. Particularly, ISLU/AIU 138 is interconnected to network element 134 of switch module 110 via link 135, and includes a plurality of LICs (or "line cards"). Each subscriber line served by switch 100 is interconnected to a network element via a particular LIC. In this example, telephone 170 is interconnected to LIC 171 via subscriber line 173, and telephone 180 is interconnected to LIC 182 via subscriber line 183.

Figure 2:
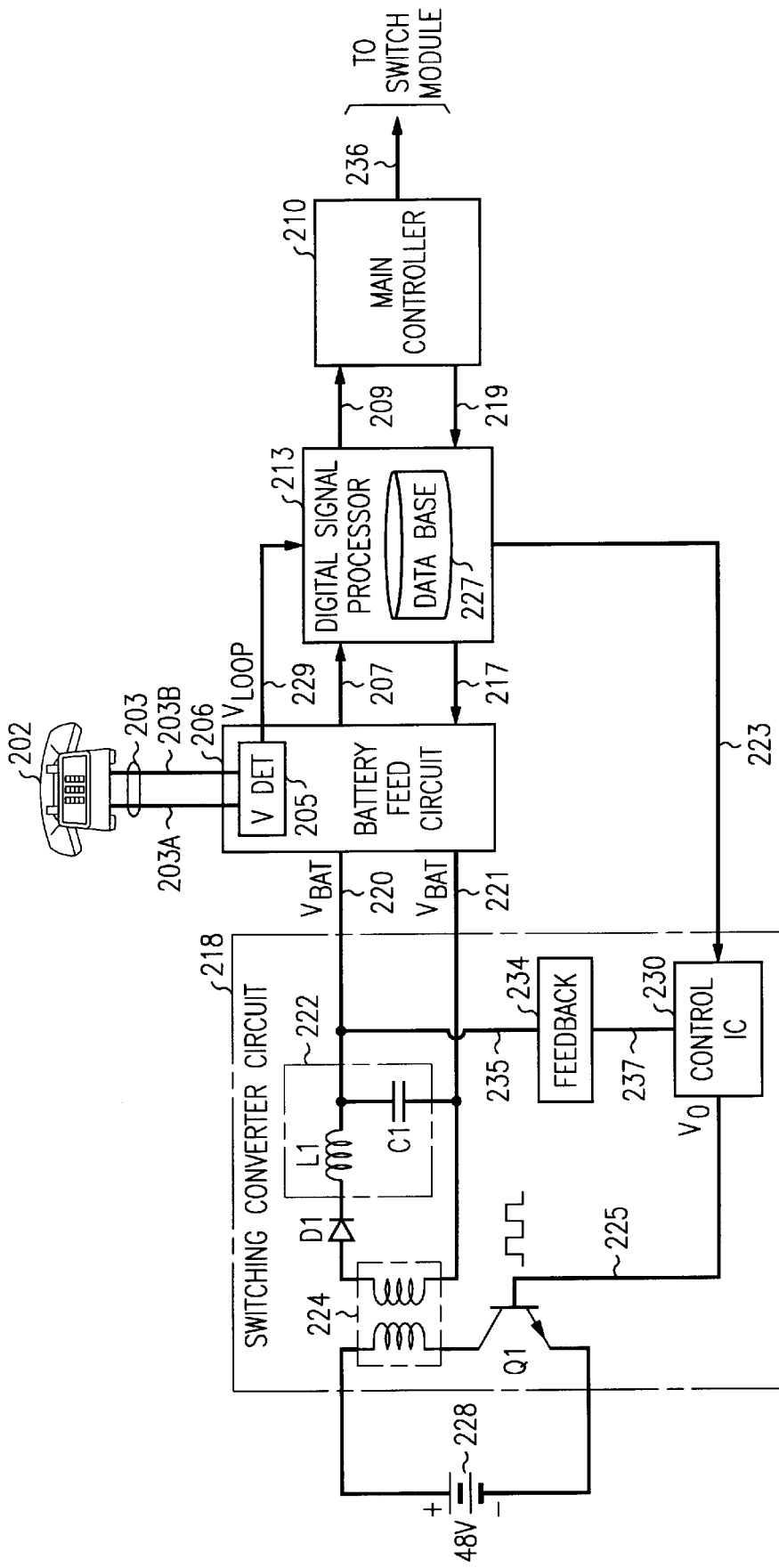
FIG. 2 is a block diagram of a LIC in accordance with a preferred embodiment of the present invention.

FIG. 2 is a detailed diagram of a preferred embodiment of the present invention. LIC 200 interconnects telephone 202 to a switch module of a central office switch, such as switch 100. The interconnection of subscriber line 203 to the central office switch enables the detection, and transmission of audio signals between telephone 202, and the public-switched telephone network via the serving central office switch. In this example, telephone 202 is interconnected to LIC 200 via subscriber loop 203 comprising "tip" line 203A and "ring" line 203B. Both tip and ring lines (collectively known as subscriber loop 203) have first ends terminating at telephone 202, and second ends interconnected to battery feed circuit 206.

Digital signal processor 213 translates audio signals, received from telephone 202 via battery feed circuit 206 and link 207, into digital format prior to delivering these signals to main controller 210 over link 209. Conversely, digital signals received from the switch module via link 219 are converted to analog format by digital signal processor 213 for delivery to battery feed circuit 206 over link 217. Signals between main controller 210 and the switching module of the serving central office switch are exchanged over signaling link 236.

During operation, digital signal processor 213 receives the loop voltage ($V_{loop}$) value associated with subscriber loop 203 over link 229. More particularly, voltage detector 205 in battery feed circuit 206 determines the voltage of subscriber loop 203, and this value is delivered to digital signal processor 213. Alternative embodiments may use a current detector instead of a voltage detector. The loop voltage of subscriber loop 203 is equivalent to the difference between the voltages of tip line 203A and ring line 203B. Loop voltage is proportional to the resistance of the subscriber loop. Since it is well-established that the resistance of a loop is proportional to its length, the loop voltage of any given subscriber loop is also proportional to length. Digital signal processor 213 includes frequency database 227 for storing a table of operating frequencies based on loop voltage (and, inferentially, upon loop length). In alternative embodiments, database 227 stores an algorithm for determining operating frequency using loop voltage.

Switching converter circuit 218 supplies power (in the form of battery voltage Vbat) to battery feed circuit 206 via leads 220 and 221. In the preferred embodiment, the switching converter unit includes: transformer circuit 224; filter 222; switching transistor Q1; application-specific integrated circuit (ASIC) controller 230; and feedback detector 234. Transformer circuit 224 is designed to operate at a range of frequencies which encompass an optimum operating frequency for a wide variety of subscriber loop lengths. Preferably, LIC 200 operates at frequencies ranging from 265 kHz to 320 kHz. Diode D1 rectifies the output of transformer circuit 224, as is known in the art. Filter 222, comprised of conductor L1 and compositor C1, serves to smooth the output voltage of transformer circuit 224, and meet ripple requirements of all operating frequencies of switching converter circuit 218. External power source 228 provides −48 volts to the switching converter circuit, as is standard in the art. ASIC controller 230 is interconnected to switching transistor Q1 via voltage link 225. During operation, ASIC controller 230 produces an output voltage $V_O$ which determines the switching frequency of transistor Q1.

To provide power needed to interconnect customer premises equipment to the serving central office switch for all subscriber loops, switching transistors in conventional LICs operate at one, relatively high, frequency. This high operating frequency ensures that sufficient current is provided to all subscriber loops, regardless of length. In accordance with the preferred embodiment of the present invention, however, the operating frequency of switching transistor Q1 is directly dependent upon the length of the subscriber loop served by the LIC. Particularly, $V_{loop}$ of a subscriber loop is detected by voltage detector 205 in battery feed circuit 206, and the voltage value is delivered to digital signal processor 213 over link 229. Digital signal processor 213 uses the loop voltage as an index to retrieve an optimum operating frequency from previously initialized database 227. The optimum operating frequency information is delivered by digital signal processor 213 to ASIC controller 230 via signaling link 223. Subsequently, ASIC controller 230 uses the received optimum operating frequency information to control the frequency of output voltage $V_O$. Output voltage $V_O$ operates switching transistor $Q_1$ of switching converter circuit 218 at the optimum operating frequency such that an adequate, but not excessive, amount of current is supplied to interconnect customer premises equipment of subscriber loop 203 to the serving central office switch. In the preferred embodiment, the lowest operating frequency is 270 kHz; and the highest operating frequency is 315 kHz.

Figure 3:
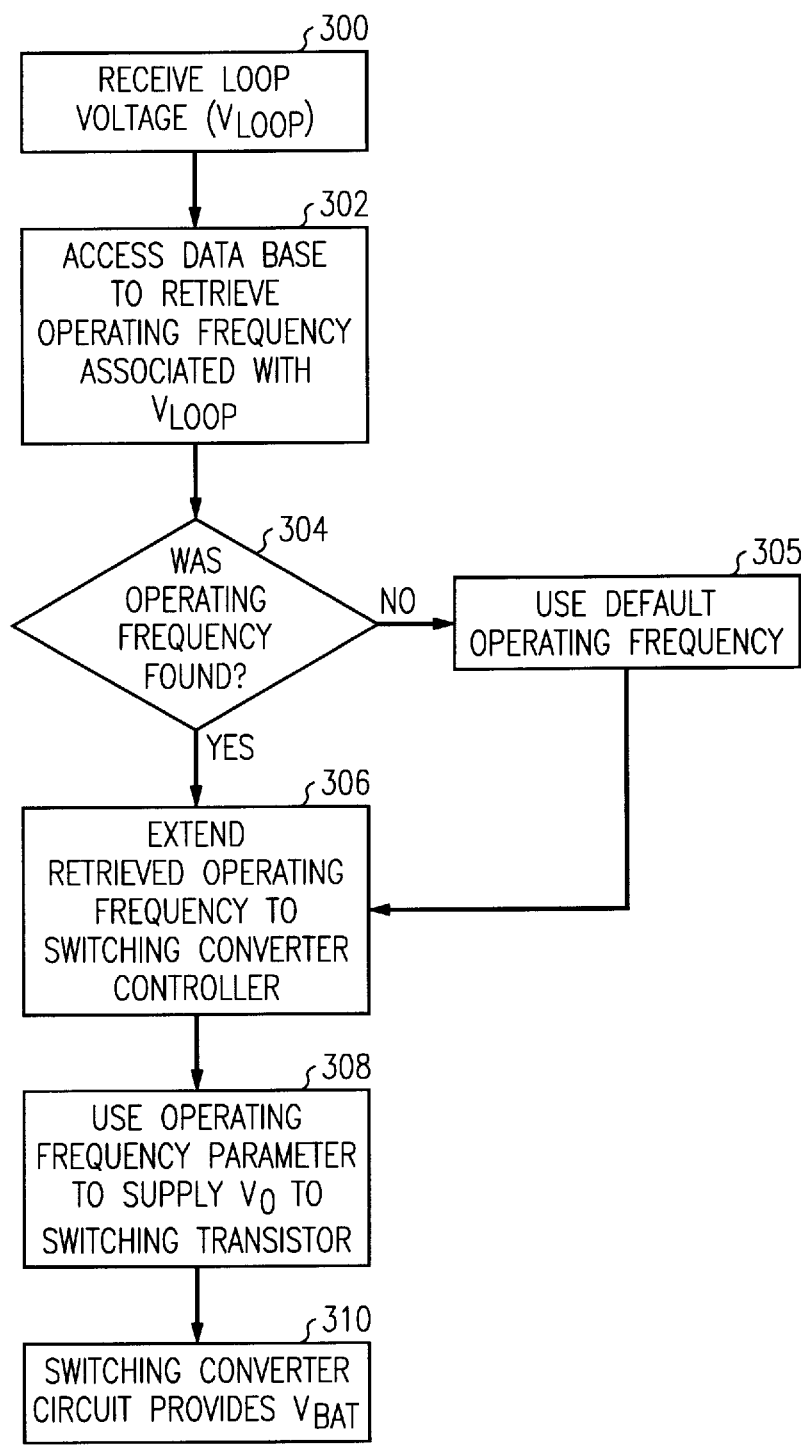
FIG. 3 is a flow diagram of the steps performed in a LIC in accordance with the preferred embodiment of the method of the present invention.

FIG. 3 illustrates steps performed in accordance with a preferred embodiment of the method of the present invention. For purposes of example, assume that the process described below is implemented by LIC 200 to serve telephone 202 via relatively short subscriber loop 203. The process begins in step 300 in which digital signal processor 213 receives a loop voltage value from battery feed circuit 206 over datalink 229. In this embodiment, battery feed circuit 206 continually monitors the loop voltage of subscriber loop 203 via voltage detector 205. The process continues to step 302 in which digital signal processor 213 access a previously initialized database to retrieve an optimum operating frequency associated with the received loop voltage value. Alternatively, the initialized database may store an algorithm for deriving optimum operating frequencies using a loop voltage value. The operating frequency obtained from database 227 is customized to ensure the subscriber customer premises equipment receives adequate power during all states including non-use ("on hook") and use ("off hook") states. By customizing the operating frequency of LIC 200, frequency-related power losses of short subscriber loops are decreased.

In decision step 304 the digital signal processor determines whether an operating frequency was found in the database. In a rare circumstance, the loop voltage received by the digital signal processor may not have a matching optimum operating frequency in database 227. If the outcome step of decision step 304 is a "NO" determination, the process continues to step 305 in which the digital signal processor extends a default operating frequency to the ASIC controller of the switching converter circuit. The default operating frequency is an operating frequency which provides sufficient current to a subscriber loop, regardless of its length. For example, the default operating frequency may be the operating frequency currently used by LICs to provide power to subscriber loops. If the outcome of decision step 304 is a "YES" determination, the process continues to step 306 in which the digital signal processor extends the retrieved operating frequency to the switching converter controller. In this example, assume that digital signal processor 213 finds, and extends, an optimum operating frequency retrieved from database 227 to ASIC controller 230 via signaling link 223. In step 308, ASIC controller 230 uses the operating frequency information supplied by the DSP to produce output voltage $V_O$ for operating switching transistor Q1. Output voltage $V_O$ has a frequency equal to the optimum operating frequency determined by the digital signal processor. Accordingly, switching transistor Q1 switches at the optimum frequency specified by output voltage $V_O$. The process continues to step 310 in which switching converter circuit 218 uses output voltage $V_O$ to produce voltage $V_{bat}$, which is supplied to the battery feed circuit via leads 220 and 221.

By customizing the operating frequency of each LIC according to subscriber loop length, frequency-related power losses are minimized. This is because reducing the operating frequency of LIC switching converter circuits in shorter subscriber loops results in proportional decreases in losses from LIC transformer circuits, and semiconductor devices. Particularly, eddy current and hysterisis losses from transformer circuit 224, and semiconductor losses associated with ASIC controller 230 are minimized when the operating frequency of switching converter circuit 218 is reduced. Advantageously, an adequate amount of power is provided to the subscriber loop during both the "on hook" and "off hook" state, but frequency-related losses are minimized for shorter subscriber loops. The cumulative effect of minimizing frequency-related losses in individual LICs results in the overall enhanced efficiency of the central office switch.

While the invention has been particularly illustrated and described with reference to the preferred embodiment, alternative embodiments may be devised by those skilled in the art without departing from the scope of the invention.

I claim:

1. In central office switch interconnected to a plurality of subscriber loops via a plurality of line interface circuits LIC, a method for decreasing power losses in at least one LIC which provides telecommunications services to at least one subscriber loop comprises the steps of:

detecting an electrical parameter associated with the subscriber line;

determining an optimum operating frequency of a switching converter circuit of the LIC to minimize power losses by using the electrical parameter as an index for accessing a database which stores a plurality of operating frequencies; and operating the LIC switching converter circuit at the optimum operating frequency.

2. The method of claim 1 wherein the step of using the loop voltage to determine an optimum operating frequency of the LIC comprises the step of:

using an algorithm to determine an optimum operating frequency.

3. The method of claim 1 further comprising the step of:

operating the LIC switching converter circuit at a default operating frequency.

4. A telecommunications line interface circuit (LIC) for interconnecting a subscriber loop to a central office switch comprises:

a battery feed circuit interconnected to the subscriber loop, the battery feed circuit including means for detecting subscriber loop voltages;

processor means interconnected to the battery feed circuit, the processor means including a database for storing a plurality of frequencies to determine an optimum operating frequency based on the subscriber loop voltage; and switching converter means interconnected to the processor means for receiving the optimum operating frequency.

5. The telecommunications LIC of claim 4 further comprising a switching transistor which operates at the optimum operating frequency received by the switching converter means.

6. The telecommunications LIC of claim 4 further comprising an algorithm stored in the database for determining an optimum operating frequency based on subscriber loop voltage.

7. The telecommunications LIC of claim 4 wherein the subscriber loop voltage is proportional to subscriber loop length.

* * * * *